July 8, 1969  J. E. DIERKS ET AL  3,454,323
ADAPTER FOR OPTICAL ELEMENTS
Filed July 15, 1968

JAMES E. DIERKS
ALLAN M. PALMER
INVENTORS

BY *Thomas R. Lampe*

*Robert W. Hampton*
ATTORNEYS

United States Patent Office 3,454,323
Patented July 8, 1969

3,454,323
ADAPTER FOR OPTICAL ELEMENTS
James E. Dierks and Allan M. Palmer, Rochester, N.Y., assignors to Eastman Kodak Company, Rochester, N.Y., a corporation of New Jersey
Continuation-in-part of application Ser. No. 519,224, Jan. 7, 1966. This application July 15, 1968, Ser. No. 752,093
Int. Cl. G02b 7/02
U.S. Cl. 350—60          8 Claims

ABSTRACT OF THE DISCLOSURE

A one-piece adapter for use with a photographic camera. The adapter mounts one or more optical elements, such as lenses or filters, incorporates a lens hood, and provides means for attenuating the response of the photocell of the associated camera to compensate for the filter factor introduced upon insertion of filters by the operator into the adapter.

CROSS-REFERENCE TO RELATED APPLICATIONS

This application is a continuation-in-part of U.S. application Ser. No. 519,224, filed Jan. 7, 1966, and entitled, "One-Piece Filter Adapter," which application is now abandoned.

BACKGROUND OF THE INVENTION

*Field of the invention*

This invention relates to adapters for holding optical elements, such as lenses or filters, on a photographic camera.

*Description of the prior art*

In the past, numerous arrangements have been provided for mounting filters and/or additional lenses on a camera objective lens. In the usual arrangement of this type, special mounting surfaces must be provided on the objective lens housing to cooperate with corresponding mounting surfaces on the attachments themselves. The provision of special mounting surfaces for this purpose adds to the cost of the camera and is not economically feasible on the less expensive camera models. In addition, arrangements have been provided for automatically compensating an automatic exposure control device for the introduction of filters in the camera lens system. A customary means for accomplishing this end has been to provide a cell masking means which is automatically positioned in front of the photocell of the camera automatic exposure control system by means of mechanical linkage arrangements. Linkage arrangements of this type also add to the expense of the camera, tend to be cumbersome, and due to their complexity, are subject to mechanical failure.

SUMMARY OF THE INVENTION

It is therefore an object of this invention to provide an adapter of the above type which is of simple, rugged construction and may be operatively mounted on a photographic camera without the provision of special mounting surfaces.

It is a further object of this invention to provide an adapter of the above type having a simple means whereby the photocell of a camera photoelectric control system may be masked manually in order to compensate for the filter factor which is introduced upon mounting of such adapter.

The above objectives have been attained in the present invention by providing a one-piece molded unit of plastic or other suitable material comprising a series of segments interconnected by means of integral hinges, said unit providing mounting surfaces for a plurality of separate lenses or filters and including a simple, manually positioned masking means for attenuating the response of a camera photoelectric control device. In addition, one of said segments functions as a hood and another of said segments comprises means for mounting the entire unit on a photographic camera objective lens housing.

Other objects, purposes, and characteristic features of the present invention will be obvious from the accompanying drawings, and from the following description of the invention. In describing the invention in detail, reference will be made to the accompanying drawings in which like reference characters designate corresponding parts throughout several views, and in which:

DESCRIPTION OF THE PREFERRED EMBODIMENT

Figure 1:
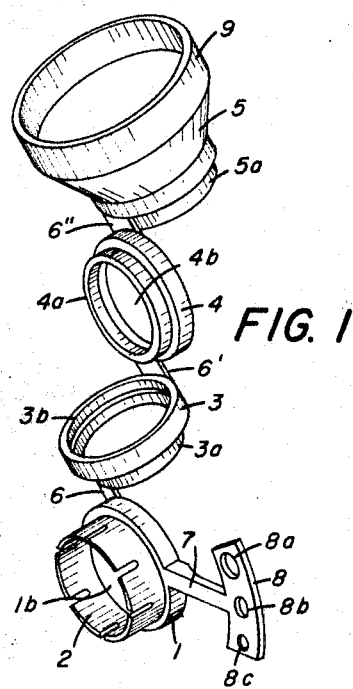
FIG. 1 is a perspective view of a preferred embodiment of the present invention showing the elements thereof in open position preparatory to mounting thereof on a photographic camera.

Referring now to FIG. 1, the filter adapter according to the present invention is shown with the elements thereof in an unfolded condition and being positioned for the reception of any lenses or filters (not shown) that the operator wishes to insert therein. The adapter is of a one-piece construction, being preferably a molded unit of plastic or other suitable material. The material used should have some degree of flexibility so that the various elements thereof may be repeatedly flexed by the operator without rupturing them. Among thermoplastic materials suitable for this purpose are polyethylenes and polypropylenes; nylon (polyamides); cellulose derivatives, e.g., cellulose acetate, cellulose acetate butyrate, cellulose acetate propionate, cellulose propionate; polystyrene, etc.

The preferred embodiment of the adapter comprises a mounting segment 1 (including a plurality of resilient mounting fingers 2), a pair of intermediate mounting segments 3, 4, and a hood segment 5. The aforementioned segments are interconnected by integral resilient hinges 6, 6', 6" which are staggered in the manner shown. The segments may be folded one upon the other in a readily apparent manner so that they are in stacked relationship to one another as shown in FIG. 2.

Intermediate mounting segment 3, intermediate mounting segment 4, and hood segment 5 include cylindrical projections 3a, 4a, and 5a, respectively, which are of smaller diameter than the respective outer walls thereof. These cylindrical projections are dimensioned in such a manner as to enter with a friction fit into cylindrical recesses 1b, 3b, and 4b of their respective adjacent segments 1, 3 and 4 when they are in the closed condition illustrated in FIG. 2. Each of the aforementioned cylindrical recesses can accommodate one or more cylindrical optical elements, such as lenses or filters, of corresponding size which may be inserted by the operator and held in position by the innermost extent of the cylindrical projection entering into said recess. Thus, the various segments comprise holders for optical elements. The number of such lenses to be inserted in the adapter is of course at the discretion of the operator in accordance with the conditions encountered.

Mounting segment 1 includes an integral masking element comprising an arm 7 and a mask plate 8 having circular openings 8a, 8b, and 8c of varying diameters therein. Hood segment 5 has a substantially elongated cylindrical wall 9 defining a light shield or hood.

Figure 2:
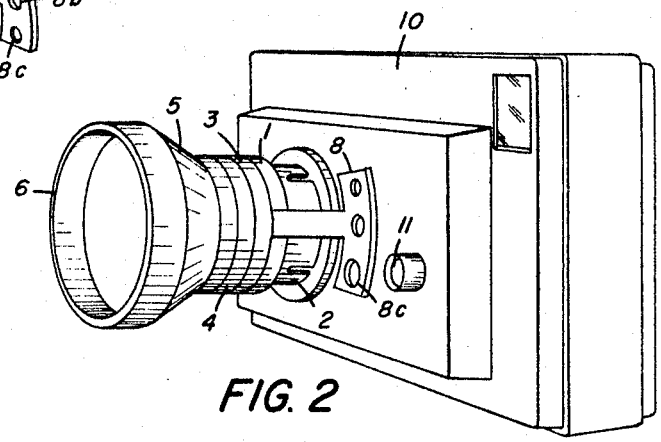
FIG. 2 shows the embodiment of FIG. 1 mounted in operating position on an associated photographic camera with the elements of the embodiment in a closed or assembled condition.

Referring now to FIG. 2, the adapter is shown in association with a camera 10 and is mounted thereon by simply slipping mounting segment 1 over the camera objective lens housing (not shown) with the resilient mounting fingers 2 of the mounting segment yieldably maintaining the adapter thereon. When the adapter is mounted in this manner, mask plate 8 of the masking element is positioned in front of photoelectric cell 11 which comprises a portion of a conventional photoelectric exposure control system. By manually rotating the adapter on the camera objective lens housing (not shown), the appropriate circular opening 8a, 8b, or 8c may be positioned with respect to the photoelectric cell to attenuate the response thereof, thereby adjusting the camera for the filter factor which has been introduced upon mounting of the adapter. The distance between the mask plate 8 and the photoelectric cell 11 has been exaggerated slightly to show more clearly their respective positions in use. As shown, circular opening 8c is in registry with the photocell. In actual practice, the mask plate would be positioned close enough to the photocell to effectively block out all incident light with the exception of that passing through the circular opening in registry with the photocell.

Although only one specific embodiment of the present invention is disclosed herein, it should be understood that the particular form disclosed has been selected to facilitate explanation of the invention rather than to limit the number of forms which it may assume. For example, it is considered feasible to employ a detent snap arrangement, rather than the friction fit arrangement shown, to maintain the segments in a closed position. In addition, the mask plate may be provided with a tapered slit, rather than the variable sized apertures disclosed, to provide greater attenuation flexibility of the device. Further, a greater or lesser number of segments than that disclosed in the preferred embodiment could be utilized in a device of this type.

The invention has been described in detail with particular reference to preferred embodiments thereof, but it will be understood that variations and modifications can be effected within the spirit and scope of the invention as described hereinabove and as defined in the appended claims.

We claim:

1. A one-piece adapter for holding an optical element on a photographic camera having an automatic exposure control system including a photocell, the adapter comprising:
   a plurality of cylindrical holders interconnected by means of flexible integral hinges;
   said holders having cooperating projection and recess means for releasably maintaining said holders in stacked relationship to one another and forming a respective enclosure between each two respective holders for retaining an optical element;
   one of said holders including mounting means for mounting said adapter on a camera; and
   one of said holders including a masking element adapted to attenuate the response of a camera automatic exposure control system by being selectively positioned in front of the camera photocell to vary the effective incident light reaching said cell.

2. An adapter according to claim 1 wherein said mounting means comprises a plurality of resilient mounting fingers for graspingly engaging a portion of the camera upon which said adapter is mounted.

3. An adapter according to claim 1 wherein said masking element comprises an arm having a mask plate integrally connected thereto, said mask plate having a plurality of circular openings of varying diameters therethrough, said openings being selectively positionable over the associated camera photocell by changing the orientation of the adapter on the camera.

4. An adapter according to claim 1 wherein one of said holders has a substantially elongated cylindrical wall defining a light shield.

5. An adapter for holding an optical element on a photographic camera, the adapter comprising:
   first and second holders, said holders having cooperating means for releasably maintaining said holders in assembled relation;
   said holders jointly defining an enclosure for an optical element when said holders are in assembled relation;
   hinge means interconnecting said holders to allow said holders to be moved from their assembled relation for insertion or removal of an optical element; and
   mounting means on one of said holders for attaching said holders to a camera.

6. An adapter as set forth in claim 5 wherein said mounting means comprises a plurality of resilient fingers adapted to frictionally engage a portion of the camera.

7. An adapter as set forth in claim 5 wherein said hinge means and said holders are integral with each other, and the cooperating means for maintaining said holders in assembled relation comprises a recess in the first holder and a projection on the second holder, said projection being dimensioned so that it fits within said recess and frictionally engages said first holder when the holders are in their assembled relation.

8. An adapter as set forth in claim 7 wherein said enclosure is within said recess, and an optical element is held in position within the enclosure by said projection.

References Cited

UNITED STATES PATENTS

| | | | |
|---|---|---|---|
| 2,058,562 | 10/1936 | Bucky et al. | |
| 2,497,018 | 2/1950 | Sherry | 350—58 |
| 3,349,682 | 10/1967 | Nerwin | 95—64 |

FOREIGN PATENTS 974,324  11/1960  Germany.

NORTON ANSHER, *Primary Examiner.*

J. F. PETERS, JR., *Assistant Examiner.*

U.S. Cl. X.R.

95—10; 350—257, 318